Patented Jan. 20, 1931

1,789,888

UNITED STATES PATENT OFFICE

GEORG WOLFSLEBEN, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

PRODUCTION OF BLACK TETRAKISAZO DYESTUFFS

No Drawing. Application filed September 1, 1927, Serial No. 217,019, and in Germany September 6, 1926.

I have found that a black tetrakisazo dyestuff, possessing very valuable properties, may be obtained by allowing 2 molecular proportions of the diazo compound of p-aminoacetanilide to act upon 1 molecular proportion of the diazo dyestuff obtainable from 1 molecular proportion of the tetrazo compound of benzidine, by acid coupling with 1 molecular proportion of 1-amino-8-naphthol-3.6-disulfonic acid, followed by alkaline coupling with 1 molecular proportion of m-phenylenediamine, the resulting tetrakisazo dyestuff being afterwards subjected to saponification in an alkaline medium.

The introduction of 2 acetylamino-p-diazobenzene radicles followed by saponification, furnishes a dyestuff which corresponds probably to the formula

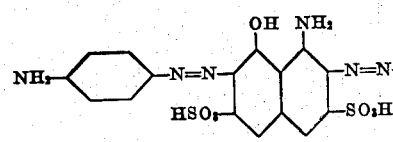 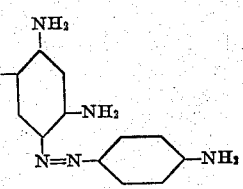

and produces valuable greenish-black shades on chrome leather without any additions of other dyestuff for adjusting the shade being necessary; the new dyestuff is very economical in use, and consequently is of great importance for dyeing chrome leather.

The new dyestuff may also be obtained by employing, instead of p-amino-acetanilide, p-nitraniline, in which case the dyestuff is subjected to reduction instead of to saponification. In most cases, however, the product is obtained in this way with a smaller yield and in a lower state of purity.

The following example will further illustrate the nature of the said invention which however is not limited thereto. The parts are by weight.

Example

A solution, slightly acid to litmus, of 127.6 parts of 1-amino-8-naphthol-3.6-disulfonic acid, 22 parts of calcined soda and 800 parts of water, is allowed to run, in a thin stream, into a cooled solution of tetrazodiphenyl, prepared by tetrazotizing 73.6 parts of benzidine in the usual manner; after stirring for 2 hours, the mixture is neutralized by the gradual addition of sodium acetate, until no mineral-acid reaction is any longer discernible. When the coupling is completed, a solution of 43.2 parts of m-phenylenediamine is added, followed at once by the introduction of 180 parts of calcined soda. When the formation of the disazo dyestuffs is completed, the mixture is warmed to about 20° C. and a solution of acetylamino-p-diazobenzene, prepared from 120 parts of p-aminoacetanilide, by diazotization in the usual way, is well stirred in. After about two hours no diazo compound will any longer be detected and the dyestuff is then rendered slightly acid to litmus by means of hydrochloric acid, and pressed.

In order to split off the acetyl groups the pressed product is stirred into caustic soda solution, the amount of the latter being such that the mixture contains 10 per cent by weight of NaOH. The saponification is effected at from 90° to 92° C. The reaction mixture is forced into water and ice, then neutralized with hydrochloric acid until the reaction becomes acid to litmus, and is finally pressed and dried.

When ground, the dyestuff produced as herein mentioned forms a dull black powder, is satisfactorily soluble in water, exhibits an excellent affinity for the fibre of chrome leather, and gives deep black dyeings, with a greenish tinge, thereon.

What I claim is:

1. As a new article of manufacture, the black tetrakisazo dyestuff corresponding probably to the formula

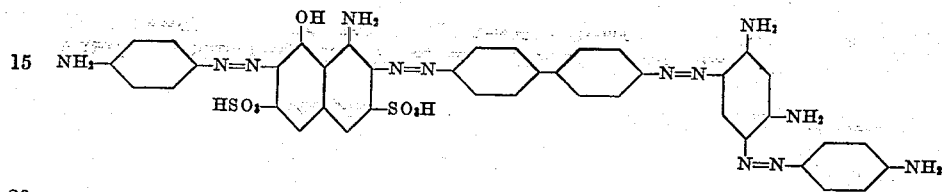

2. The process of producing black tetrakisazo dyestuff which consists in coupling 2 molecular proportions of para-diazo-acetyl-aminobenzene with 1 molecular proportion of the disazo dyestuff obtainable from 1 molecular proportion of tetrazotized benzidine by acid coupling with 1 molecular proportion of 1-amino-8-naphthol-3.6-disulfonic acid and subsequent alkaline coupling with 1 molecular proportion of m-phenylenediamine, and saponifying the resulting tetrakisazo compound.

In testimony whereof I have hereunto set my hand.

GEORG WOLFSLEBEN.